US007295670B2

(12) United States Patent
Abe

(10) Patent No.: US 7,295,670 B2
(45) Date of Patent: Nov. 13, 2007

(54) HOWLING SUPPRESSION DEVICE AND HOWLING SUPPRESSION METHOD

(75) Inventor: Ryoji Abe, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 72 days.

(21) Appl. No.: 10/533,653

(22) PCT Filed: Feb. 27, 2004

(86) PCT No.: PCT/JP2004/002417

§ 371 (c)(1), (2), (4) Date: May 5, 2005

(87) PCT Pub. No.: WO2004/080117

PCT Pub. Date: Sep. 16, 2004

(65) Prior Publication Data

US 2006/0115094 A1 Jun. 1, 2006

(30) Foreign Application Priority Data

Mar. 5, 2003 (JP) ............................ 2003-058362

(51) Int. Cl.
*H04M 9/08* (2006.01)

(52) U.S. Cl. ................................................ 379/406.01

(58) Field of Classification Search ................. 381/318
See application file for complete search history.

(56) References Cited

U.S. PATENT DOCUMENTS

| | | | | |
|---|---|---|---|---|
| 5,633,936 | A | 5/1997 | Oh | |
| 5,677,987 | A * | 10/1997 | Seki et al. | 704/226 |
| 5,710,823 | A * | 1/1998 | Nagata et al. | 381/83 |
| 5,828,756 | A | 10/1998 | Benesty et al. | |
| 5,901,230 | A | 5/1999 | Walker | |
| 2003/0138117 | A1 * | 7/2003 | Goff | 381/103 |

FOREIGN PATENT DOCUMENTS

| | | |
|---|---|---|
| JP | 7-143034 | 6/1995 |
| JP | 9-27775 | 1/1997 |
| JP | 10-190848 | 7/1998 |
| JP | 2002368658 A | 12/2002 |

* cited by examiner

*Primary Examiner*—Ramnandan Singh
(74) *Attorney, Agent, or Firm*—Pearne & Gordon LLP

(57) ABSTRACT

An acoustic feedback suppression apparatus according to the present invention comprises a notch filter (109) for filtering out acoustic feedback components, a plurality of first sample fast Fourier transformation means (118 to 120) for performing frequency analysis of every 512 data samples, a plurality of peak frequency detecting means (121 to 123) for detecting peak frequencies of respective channels, adding means (124) for adding signals on the respective channels, second sample fast Fourier transformation means (125) for performing frequency analysis of every 4096 data samples of the added signal, peak frequency detecting means (126) for detecting a peak frequency of the output signal outputted from the 4096 fast Fourier transformation means (125), and coefficient specifying means (129) for specifying filter coefficients of the notch filter (109).

9 Claims, 6 Drawing Sheets

HOWLING SUPPRESSION DEVICE AND HOWLING SUPPRESSION METHOD

TECHNICAL FIELD

The present invention relates to an acoustic feedback suppression apparatus and an acoustic feedback suppression method, and more particularly to an acoustic feedback suppression apparatus for and an acoustic feedback suppression method of suppressing acoustic feedback by judging whether or not the acoustic feedback is caused.

BACKGROUND ART

Up until now, there have been proposed a wide variety of conventional acoustic feedback suppression apparatuses of this type. One typical example of the conventional acoustic feedback suppression apparatuses is disclosed in Japanese Patent Laid-Open Publication No. 07-143034 (see page 4 and FIG. 1).

The conventional acoustic feedback suppression apparatus 50 is shown in FIG. 5 as comprising an input terminal 1 having a sound signal inputted therein, an AD converter 2 for carrying out analog-to-digital conversion of the sound signal, a notch filter 3 connected to the AD converter 2, a DA converter 4 for carrying out digital-to-analog conversion of the sound signal, an output terminal 5 having the sound signal outputted therethrough, an FFT 6 for converting the sound signal outputted from the notch filter 3 into digital data with a predetermined number of data samples to perform a frequency analysis of the digital data, a determining unit 7 for determining the result of the analysis performed by the FFT 6, coefficient storing means 8 for storing therein prepared coefficients of the notch filter 3, a memory 9 for memorizing therein the coefficients of the notch filter 3, and coefficient selection means 10 for selecting the coefficients to be transferred to the memory 9 from among the coefficients stored in the coefficient storing means 8.

In the operation of the conventional acoustic feedback suppression apparatus 50, the frequency analysis of the sound signal outputted from the notch filter 3 is firstly performed by the FFT 6. The acoustic feedback characteristic of the sound signal, such as for example a peak frequency, is then determined by the determining unit 7, and only the specific coefficients each having a center frequency equal to the peak frequency determined by the determining unit 7 are selected by the coefficient selection means 10 from among the coefficient stored in the coefficient storing means 8. The coefficients thus selected are then transferred to the memory 9 by the coefficient selection means 10 before acoustic feedback components are filtered by the notch filter 3 specified with the coefficients out of the sound signal.

As will be seen from the above mentioned description, the conventional acoustic feedback suppression apparatus 50 is designed to suppress the acoustic feedback in the sound signal by specifying the filter coefficients of the notch filter 3 in response to the acoustic feedback characteristic of the sound signal.

The conventional acoustic feedback suppression apparatus thus constructed as previous mentioned, however, encounters such a problem that a relatively large number of data samples are required for performing the frequency analysis to specify the coefficients of the notch filter with high accuracy in the conventional acoustic feedback suppression apparatus. This leads to the fact that, when the conventional acoustic feedback suppression apparatus simultaneously suppresses the acoustic feedback in sound signals respectively inputted to a plurality of channels, the data-processing load of the frequency analysis becomes heavy with the number of the channels increased, thereby needing the memory with high-capacity.

It is, therefore, an object of the present invention to provide an acoustic feedback suppression apparatus which can lessen the data-processing load of the frequency analysis and decrease the capacity of the memory even if simultaneously suppressing the acoustic feedback of the sound signals respectively inputted to a plurality of channels.

DISCLOSURE OF THE INVENTION

According to a first aspect of the present invention, there is provided an acoustic feedback suppression apparatus for suppressing acoustic feedback, comprising: sound signal inputting means for inputting sound signals from a plurality of signal paths; filtering means for filtering out acoustic feedback components from the sound signals; signal path identifying means for identifying the signal paths having the acoustic feedback caused thereon after converting each of the sound signals into digital data with a first number of data samples; and filter coefficient specifying means for specifying filter coefficients of the filtering means after adding the sound signals respectively inputted from the signal paths and converting into digital data with a second number of data samples, wherein the second number of data samples is larger than the first number of data samples, and the filtering means is adapted to filter on the basis of the filter coefficients specified by the filter coefficient specifying means out the acoustic feedback components on the signal paths identified by the signal path identifying means.

In accordance with the above construction, the signal path identifying means are adapted to identify the signal paths having the acoustic feedback caused thereon after converting each of the sound signals into digital data with the first number of data samples, filter coefficient specifying means are adapted to specify filter coefficients of the filtering means after adding the sound signals respectively inputted from the signal paths and converting into digital data with the second number of data samples, the second number of data samples being larger than the first number of data samples, and filtering means is adapted to filter on the basis of the filter coefficients specified by the filter coefficient specifying means out the acoustic feedback components on the signal paths identified by the signal path identifying means to suppress the acoustic feedback. The acoustic feedback suppression apparatus thus constructed can lessen the data-processing load of the frequency analysis and decrease the capacity of the memory even if simultaneously suppressing the acoustic feedback of the sound signals respectively inputted to a plurality of channels.

According to a second aspect of the present invention, the acoustic feedback suppression apparatus may further comprising acoustic feedback characteristic comparing means for comparing characteristics of the acoustic feedback components converted into the digital data with the first number of data samples with characteristics of the acoustic feedback components converted into the digital data with the second number of data samples, the signal path identifying means being adapted to identify the signal paths having the acoustic feedback caused thereon based on the result of the comparison made by the acoustic feedback characteristic comparing means.

In accordance with the above construction, the signal path identifying means are adapted to identify the signal paths having the acoustic feedback caused thereon based on the result of the comparison made by the acoustic feedback characteristic comparing means. The acoustic feedback suppression apparatus thus constructed can reliably identify the channels having the acoustic feedback caused thereon and suppress the acoustic feedback even if simultaneously suppressing the acoustic feedback of the sound signals respectively inputted to a plurality of channels.

According to a third aspect of the present invention, the acoustic feedback characteristic comparing means is adapted to convert the digital data with the second number of data samples into digital data with the first number of data samples to compare the characteristics of the acoustic feedback components converted into the digital data with the first number of data samples with the characteristics of the acoustic feedback components converted into the digital data with the second number of data samples.

In accordance with the above construction, the acoustic feedback characteristic comparing means are adapted to convert the number of data samples to compare the characteristics of the acoustic feedback. The acoustic feedback suppression apparatus thus constructed can reliably identify the channels having the acoustic feedback caused thereon and suppress the acoustic feedback even if simultaneously suppressing the acoustic feedback of the sound signals respectively inputted to a plurality of channels.

According to a fourth aspect of the present invention, the number of the signal path identifying means may be smaller than the number of the signal paths.

In accordance with the above construction, the number of the signal path identifying means may be smaller than the number of the signal paths. The acoustic feedback suppression apparatus thus constructed can simultaneously suppress the acoustic feedback of the sound signals respectively inputted to a plurality of channels at low cost.

According to a fifth aspect of the present invention, there is provided an acoustic feedback suppression method, comprising the steps of: adding sound signals respectively inputted from a plurality of signal paths; judging whether or not acoustic feedback is caused in the added sound signal; judging whether or not the acoustic feedback is caused in each of the sound signals respectively inputted from the signal paths when the acoustic feedback is judged to be caused in the added sound signal; calculating filter coefficients for each of the sound signals having the acoustic feedback judged to be caused therein; and suppressing the acoustic feedback on the basis of the filter coefficients calculated.

The acoustic feedback suppression method thus constructed can lessen the data-processing load of the frequency analysis and decrease the capacity of the memory even if simultaneously suppressing the acoustic feedback of the sound signals respectively inputted to a plurality of channels.

BRIEF DESCRIPTION OF THE DRAWINGS

The features and advantages of an acoustic feedback suppression apparatus according to the present invention will be more clearly understood from the following detailed description when considered in connection with the accompanying drawings, in which:

FIG. 4(*b*) is a diagram showing a data processing time of an FFT process of one preferred embodiment of the acoustic feedback suppression apparatus according to the present invention.

BEST MODE FOR CARRYING OUT THE INVENTION

One of the preferred embodiments of the acoustic feedback suppression apparatus and the acoustic feedback suppression method according to the present invention will now be described in accordance with accompanying FIGS. 1A to 4.

The following description will now be directed to the construction of the preferred embodiment of the acoustic feedback suppression apparatus and the acoustic feedback suppression method according to the present invention.

Figure 1A:
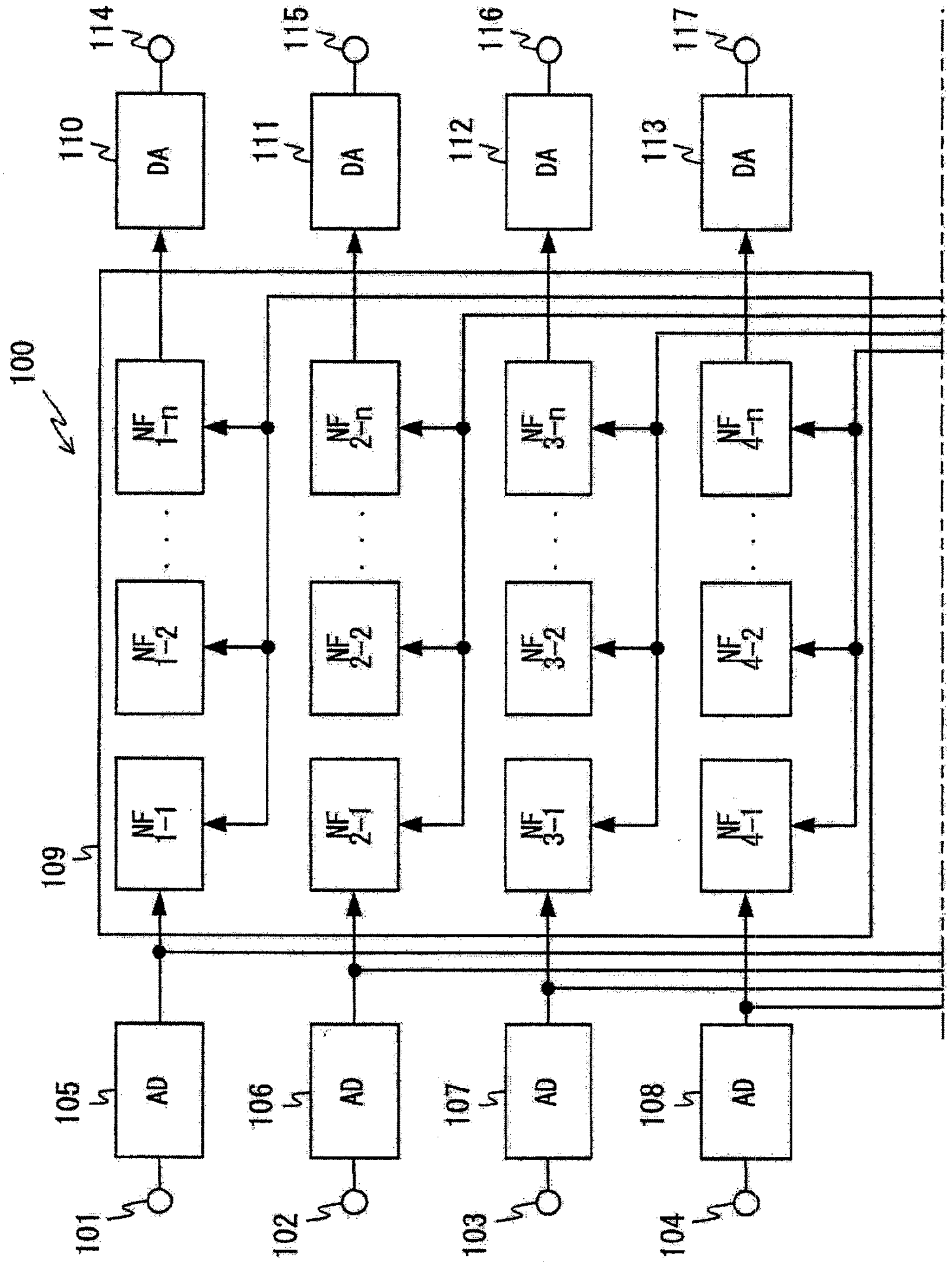
FIGS. 1A and 1B represent block diagram showing one preferred embodiment of the acoustic feedback suppression apparatus according to the present invention.

The acoustic feedback suppression apparatus 100 is shown in FIG. 1A as comprising a plurality of input terminals 101 to 104 respectively having analog sound signals inputted therein on first to fourth channels, a plurality of AD converters 105 to 108 for respectively converting the analog sound signals on the respective channels into digital sound signals, a notch filter unit 109 for filtering out acoustic feedback components from the digital sound signals on the respective channels, a plurality of DA converters 110 to 113 for respectively converting the digital sound signals on the respective channels into analog sound signals, and a plurality of output terminals 114 to 117 respectively having the analog sound signals outputted therethrough on the respective channels. In FIG. 1, the AD converter, the notch filter, and the DA converter are respectively represented by legends "AD", "NF", and "DA".

Figure 1B:
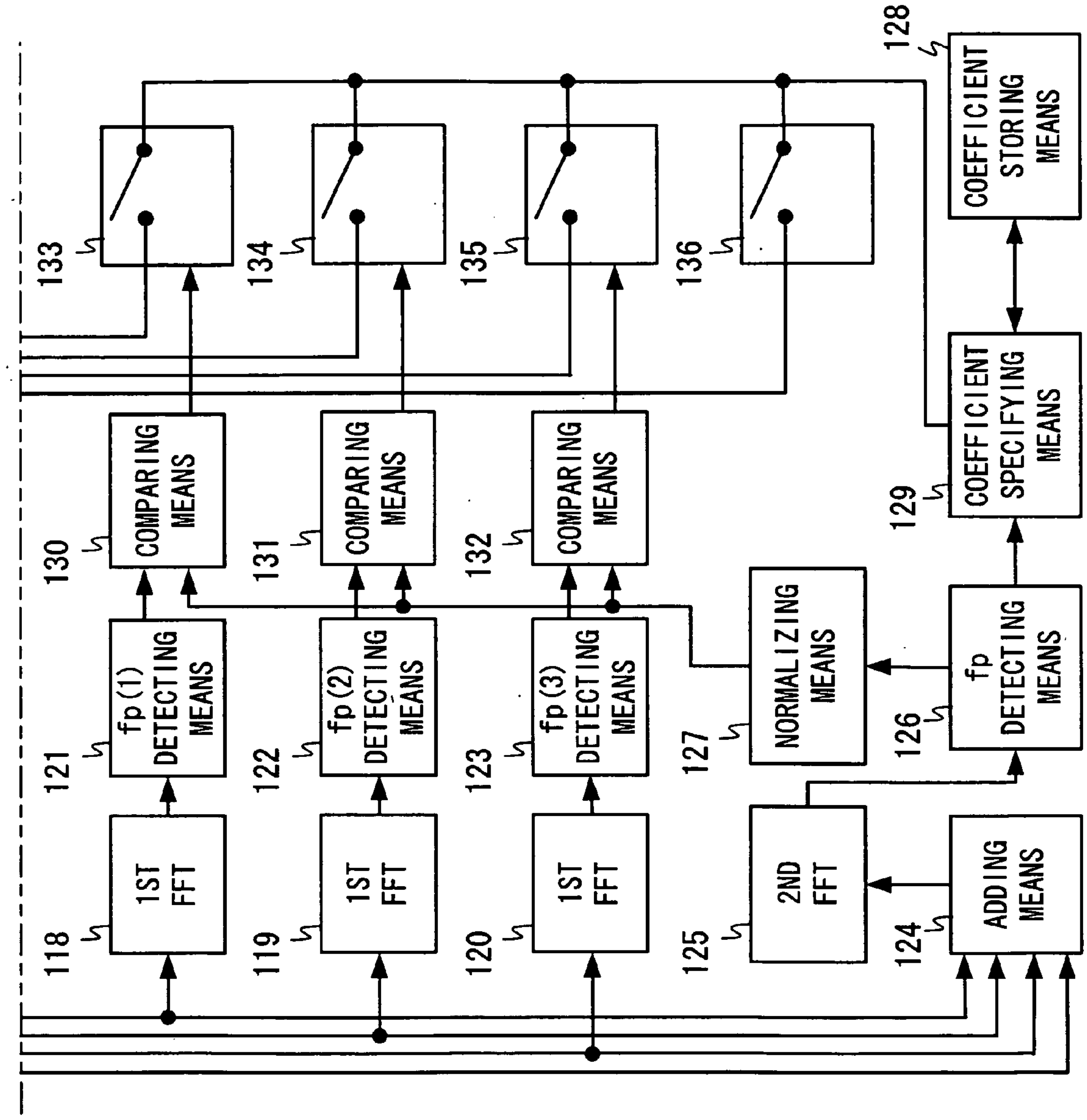

The acoustic feedback suppression apparatus 100 shown in FIG. 1B comprises a plurality of first sample fast Fourier transformation means 118 to 120 for respectively performing frequency analysis of every 512 data samples of the output signals outputted from the respective AD converters 105 to 108, a plurality of peak frequency detecting means 121 to 123 for respectively detecting peak frequencies of the respective channels, adding means 124 for adding the output signals outputted from the respective AD converters 105 to 108, second sample fast Fourier transformation means 125 for performing frequency analysis of every 4096 data samples of the added digital sound signal, peak frequency detecting means 126 for detecting a peak frequency of the output signal outputted from the 4096 fast Fourier transformation means 125, normalizing means 127 for converting the result of the detection made by the peak frequency detecting means 126 into digital data with 512 data samples, coefficient storing means 128 for previously storing therein filter coefficients of the notch filter unit 109, coefficient specifying means 129 for specifying the filter coefficients of the notch filter unit 109, a plurality of comparing means 130 to 132 for respectively comparing the results of the detection of the peak frequencies of the respective channels with the result normalized by the normalizing means 127, and a plurality of switching means 133 to 136 for respectively opening and closing the signal paths between the coefficient specifying means 129 and the notch filter unit 109.

The term "first channel" is intended to indicate a signal path from the input terminal 101 to the output terminal 114, the term "second channel" is intended to indicate a signal path from the input terminal 102 to the output terminal 115, the term "third channel" is intended to indicate a signal path from the input terminal 103 to the output terminal 116, and the term "fourth channel" is intended to indicate a signal path from the input terminal 104 to the output terminal 117.

The first sample fast Fourier transformation means is simply referred to as "1st FFT", while the second sample fast Fourier transformation means is simply referred to as "2nd FFT". The peak frequency detected by the peak frequency detecting means of the k-th channel is represented by a legend "fp(k)". The peak frequency detecting means of the k-th channel is simply referred to as "fp(k) detecting means". The peak frequency detected by the peak frequency detecting means 126 is represented by a legend "fp". The peak frequency detecting means for detecting the peak frequency fp is simply referred to as "fp detecting means".

The fp(1) detecting means 121 to the fp(3) detecting means 123, the adding means 124, the fp detecting means 126, the normalizing means 127, the coefficient specifying means 129, and the comparing means 130 to 132 are constituted by CPU, RAM, ROM, and other elements. The coefficient storing means 128 is constituted by, for example, a semiconductor memory or a magnetic disc.

The input terminals 101 to 104 collectively constitute sound signal inputting means, while the notch filter unit 109 constitutes filtering means. The 1st FFT of the first to third channels, the fp(k) detecting means, and the comparing means 130 to 132 collectively constitute signal path identifying means. The adding means 124, the 2nd FFT 125, the fp detecting means 126, the coefficient storing means 128, and the coefficient specifying means 129 collectively constitute filter coefficient specifying means. The comparing means 130 to 132 and the normalizing means 127 collectively constitute acoustic feedback characteristic comparing means.

The input terminals 101 to 104 are respectively connected to, for example, different microphones to input the respective analog sound signals therefrom.

The output terminals 114 to 117 are respectively connected to, for example, audio amplifiers and speakers. The audio amplifiers are adapted to amplify the respective analog sound signals converted by the DA converters 110 to 113 to have the speakers output the respective analog sound signals therethrough.

The notch filter unit 109 is constituted by four channels each having n number of notch filters. The notch filters have respective specified coefficients so that the notch filter unit 109 can suppresses acoustic feedback caused in the sound signals outputted from the speakers and inputted to the microphones with the coefficients of the notch filters of the notch filter unit 109 specified. Each of the coefficients of the notch filter is a numerical value calculated based on the frequency, amplitude, acuteness and others of the acoustic feedback. Only one notch filter may be provided in each of the channels according to the present invention.

The fp(1) detecting means 121 of the first channel are adapted to detect the fp(1) on the basis of the digital data with 512 data samples frequency-analyzed by the 1st FFT 118, and to output the fp(1) to the comparing means 130. The fp(2) detecting means 122 and the fp(3) detecting means 123 of the second and third channels are also adapted to detect the respective fp(2) and fp(3) on the basis of the digital data with 512 data samples frequency-analyzed by the respective 1st FFTs 119 and 120, and to output the respective fp(2) and fp(3) to the comparing means 131 and 132.

The 2nd FFT 125 is adapted to convert the added digital sound signal constituted by the digital sound signals added by adding means 124 into the digital data with 4096 data samples before performing the frequency analysis of the digital data, and to output the digital data to the fp detecting means 126. The fp detecting means 126 are adapted to detect the fp on the basis of the digital data with 4096 data samples frequency-analyzed, and to output the fp to the normalizing means 127 and the coefficient specifying means 129.

The normalizing means 127 are adapted to normalize the digital data with 4096 data samples to digital data with 512 data samples, and to output the normalized digital data to the comparing means 130 to 132. Here, the expression "to normalize" is intend to means, for example, "to divide digital data with 4096 data samples into 8, equal to the ratio of 4096 to 512, to be converted into digital data with 512 data samples to ensure that the peak frequency of the digital data with 4096 data samples is compared with the peak frequency of the digital data with 512 data samples".

The comparing means 130 to 132 are adapted to compare the fp(k) detected in each channel with the fp, and to set "ON" to any one of the switching means 133 to 136 of the channels in which the fp(k) conforms to the fp.

The coefficient specifying means 129 are adapted to read from the coefficient storing means 128 the coefficients in response to the fp detected by the fp detecting means 126, and to specify the coefficients of the notch filter unit 109 via the switching means 133 to 136. The switching means 136 are adapted to be set "ON" by the coefficient specifying means 129 when none of the switching means 133 to 135 are set "ON".

The operation of the acoustic feedback suppression apparatus 100 will be described hereinafter with reference to FIGS. 1 and 2.

Figure 2:
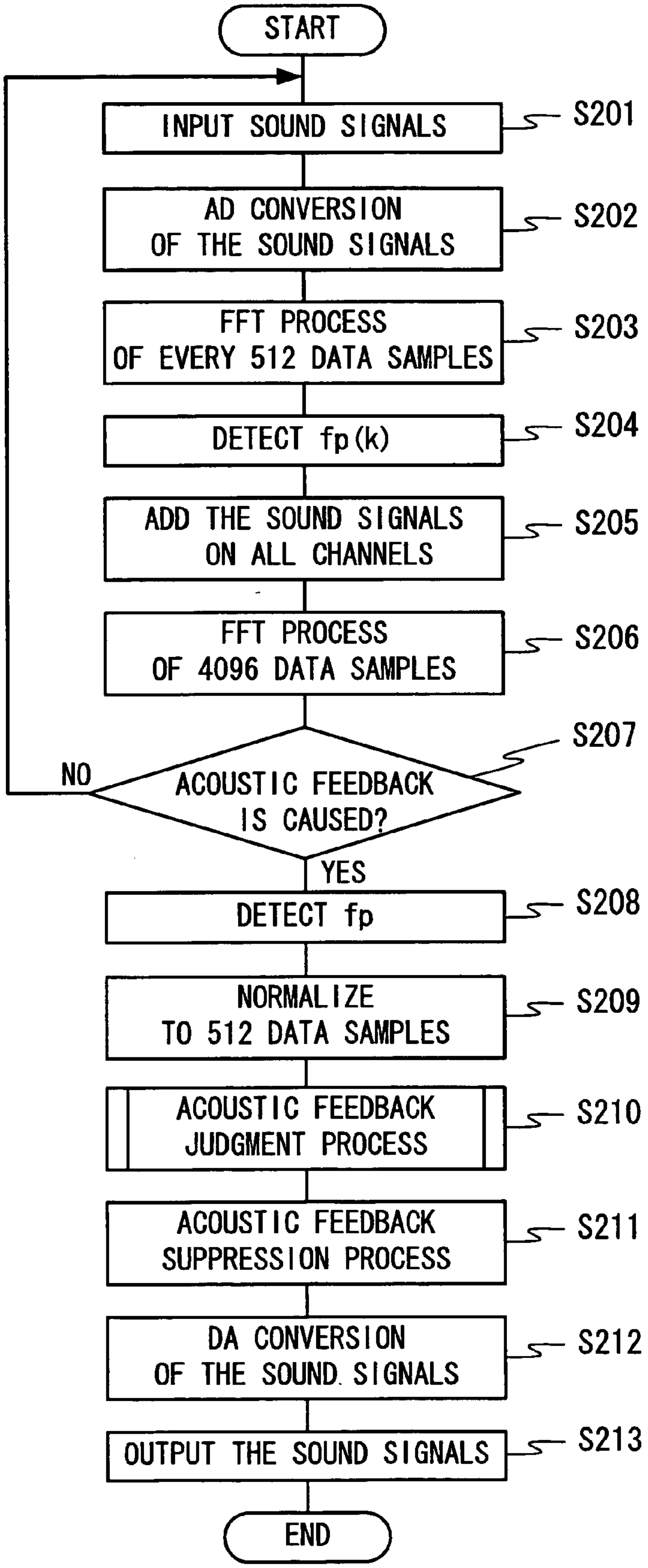
FIG. 2 is a flowchart showing the operation of one preferred embodiment of the acoustic feedback suppression apparatus according to the present invention.

In FIG. 2, the analog sound signals are firstly inputted to the input terminals 101 to 104 of the respective channels (Step S201). The analog sound signals are then converted into the digital sound signals by the AD converters 105 to 108 of the respective channels (Step S202). The digital sound signals of the respective channels are then converted into the digital data with 512 data samples by the 1st FFT 118 to 120 respectively connected to the first to third channels. The frequency analysis of the digital data is then performed by the 1st FFT 118 to 120 (Step S203).

The fp(k) are then detected by the fp(1) detecting means 121 to the fp(3) detecting means 123 respectively connected to the first to third channels (Step S204). The digital sound signals on all channels are then added by the adding means 124 (Step S205). The added digital sound signal constituted by the digital sound signals added is then converted by the 2nd FFT 125 into the digital data with 4096 data samples. The frequency analysis of the digital data is then performed by the 2nd FFT 125 (Step S206). The judgment is then made by the fp detecting means 126 on whether or not the acoustic feedback is caused in the added digital sound signal constituted by the digital sound signals added (Step S207).

When the judgment is made that the acoustic feedback is caused in the step S207, the fp is detected by the detecting means 126 and outputted to the normalizing means 127 and the coefficient specifying means 129 (Step S208). When, on the other hand, the judgment is made that the acoustic feedback is not caused in the step S207, the operation is returned to the step S201.

The digital data with 4096 data samples is then normalized by the normalizing means 127 to the digital data with 512 data samples (Step S209). An acoustic feedback judgment process to be hereinafter described in detail is then performed by the comparing means 130 to 132 (Step S210).

The coefficients in response to the fp are then read by the coefficient specifying means 129 from the coefficient storing means 128, and the acoustic feedback suppression process is performed when the coefficients of the notch filter unit 109 are specified via the switching means 133 to 136 (Step S211). The digital sound signals are then respectively converted by the DA converters 110 to 113 connected to the respective channels into the analog sound signals (Step S212), and the analog sound signals are then outputted from the output terminals 114 to 117 (Step S213).

The acoustic feedback judgment process in the step S210 will be described hereinafter with reference to FIG. 3.

Figure 3:
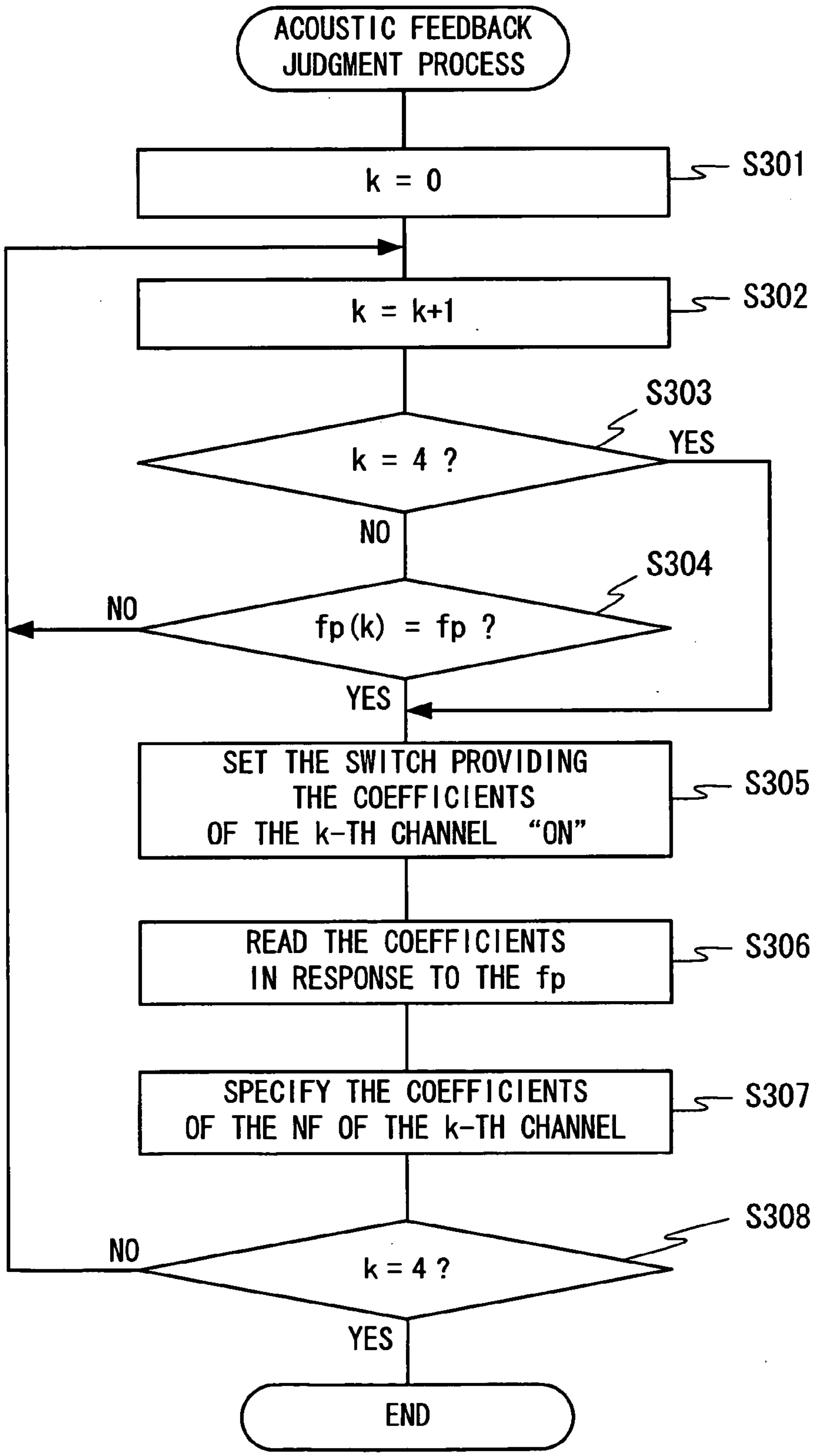
FIG. 3 is a flowchart showing an acoustic feedback judgment process of one preferred embodiment of the acoustic feedback suppression apparatus according to the present invention.

In FIG. 3, the value zero is substituted by the coefficient specifying means 129 for a numerical value "k" indicative of the channel (Step S301). The calculation "k=k+1" is then made by the coefficient specifying means 129 (Step S302), and the judgment for the first channel is initially made. The judgment is made by the coefficient specifying means 129 on whether or not the numerical value "k" is equal to 4 (Step S303). When the judgment is made that the numerical value "k" is not equal to 4 in the step S303, the fp(1) is compared by the comparing means 130 with the fp (Step S304).

When the fp(1) is consonant with the fp in the step S304, i.e., the acoustic feedback is judged to be caused on the first channel, the switching means 134 providing respectively the coefficients to the notch filters 1-1 to 1-*n* of the first channel is set "ON" by the comparing means 130 (Step S305).

When, on the other hand, the fp(1) is not consonant with the fp in the step S304, i.e., the acoustic feedback is judged not to be caused on the first channel, the acoustic feedback judgment process is returned to the step S302, and the numerical value "k" is incremented. Here, the judgment on whether or not the fp(1) is consonant with the fp is not limited to the judgment on whether or not the fp(1) is completely consonant with the fp, and is made with counting a predetermined tolerance according to the present invention.

The coefficients in response to the fp are then read by the coefficient specifying means 129 from the coefficient storing means 128 (Step S306), and the coefficients of the notch filters 1-1 to 1-*n* of the first channel are specified via the switching means 134 (Step S307).

The judgment is then made by the coefficient specifying means 129 on whether or not the numerical value "k" is equal to 4 (Step S308). When the judgment is made that the numerical value "k" is not equal to 4 in the step S308, the acoustic feedback judgment process is returned to the step S302, and the numerical value "k" is incremented. When, on the other hand, the judgment is made that the numerical value "k" is equal to 4, the acoustic feedback judgment process is terminated.

As described above, when the fp(k) is judged to be consonant with the fp in the step S304 under the state that the numerical value "k" is within the range from 1 to 3, the coefficients of the respective channels are specified by the coefficient specifying means 129. When the fp(k) is judged not to be consonant with the fp in the step S304 under the state that the numerical value "k" is within the range from 1 to 3, i.e., the acoustic feedback is regarded as being caused on the fourth channel, the acoustic feedback judgment process is skipped from the step S303 to the step S305, and the coefficients of the notch filters of the fourth channel are specified.

The data processing time of the fast Fourier transformation process will be described hereinafter with reference to the drawings of FIG. 4.

Figure 4A:
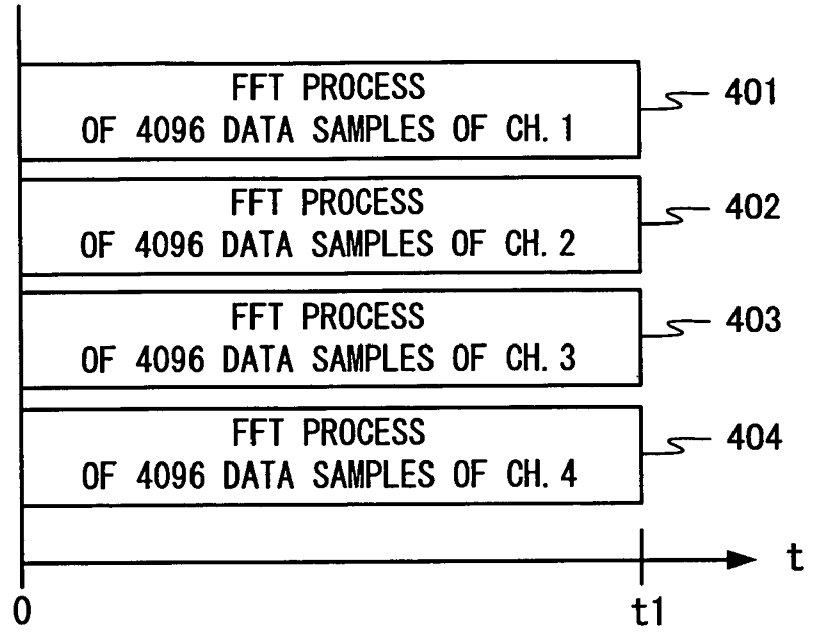
FIG. 4(*a*) is a diagram showing a data processing time of an FFT process of the conventional acoustic feedback suppression apparatus.
Figure 4B:
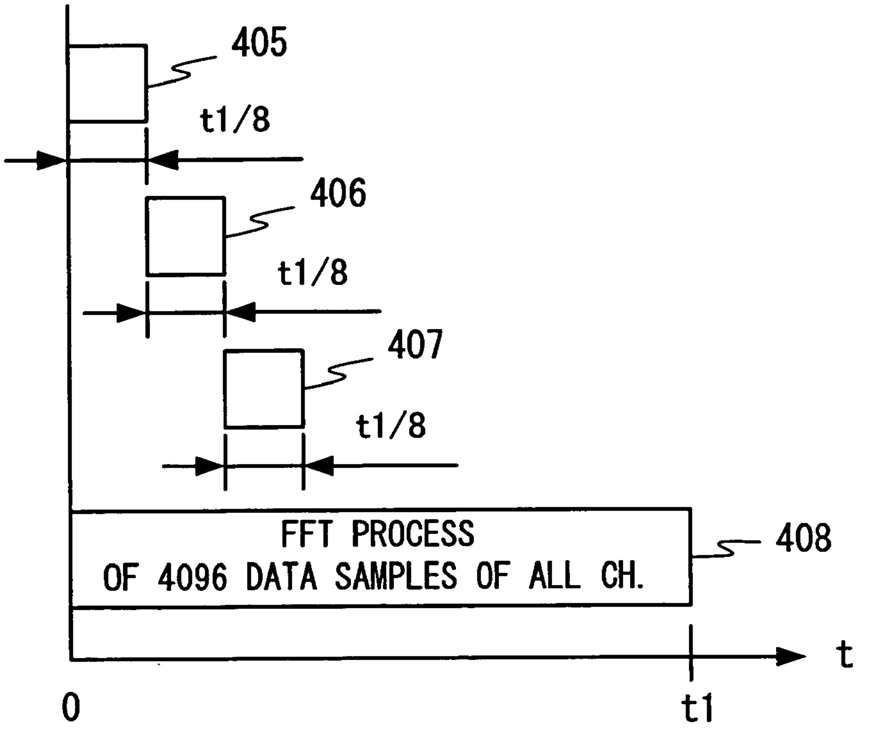
Figure 5:
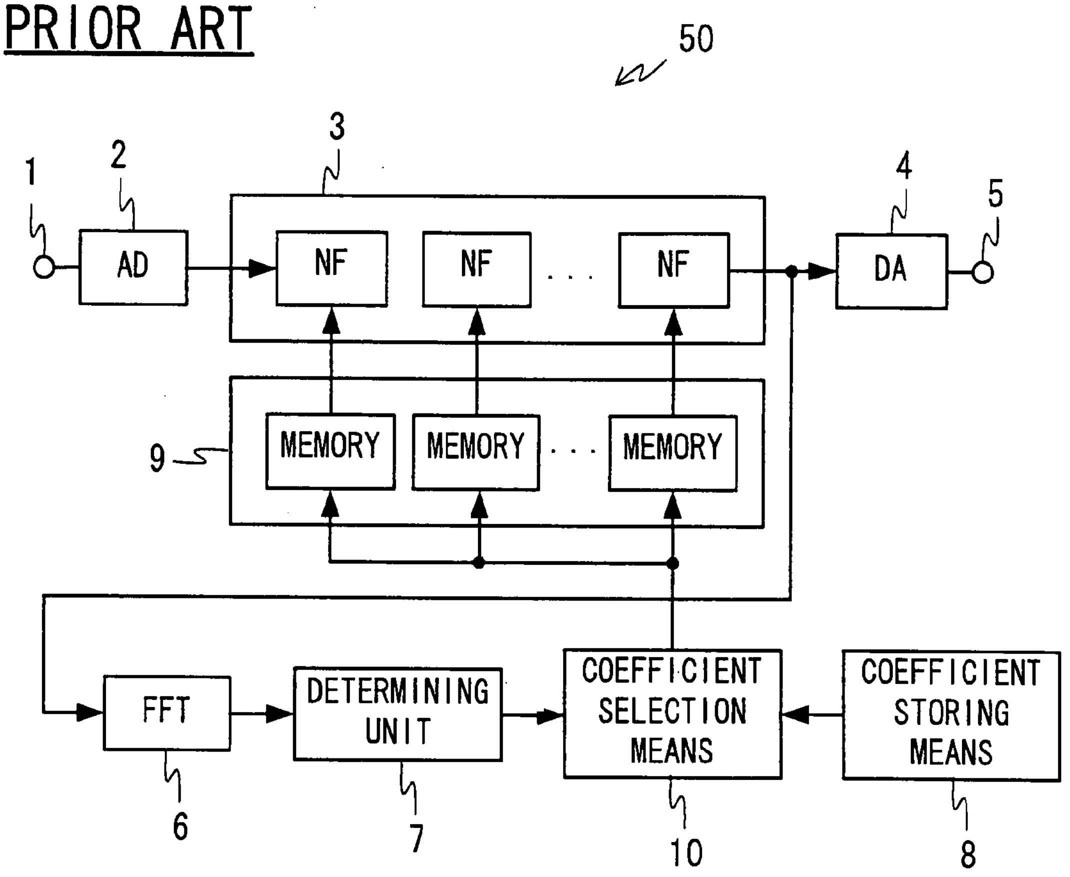
FIG. 5 PRIOR ART
FIG. 5 is a block diagram of the conventional acoustic feedback suppression apparatus.

FIG. 4(*a*) shows the data processing time of the 4-channel FFT process of the conventional acoustic feedback suppression apparatus. As will be seen from FIG. 4(*a*), each of the channels is processed with every 4096 data samples in parallel with other channels, and each of the data processing times of the FFT processes 401 to 404 of the first to fourth channels is "t1".

FIG. 4(*b*), in contrast, shows the data processing time of the FFT process of the acoustic feedback suppression apparatus 100 according to the present invention. The data processing time of the FFT process 408 of all channels is "t1" by the reason that the FFT process 408 of all channels is performed for every 4096 data samples in a similar manner to the conventional FFT process to specify the coefficients of the notch filter unit 109 with high accuracy. However, each of the FFT processes 405 to 407 of the first to third channels does not need accuracy higher enough to specify the coefficients of the notch filter unit 109 than the conventional FFT process by the reason that each of the FFT processes 405 to 407 is designed for the purpose of identifying the channel having the acoustic feedback caused thereon. For this reason, each of the FFT processes 405 to 407 can be performed only with every 512 data samples in the embodiment of the acoustic feedback suppression apparatus according to the present invention. This results in the fact that each of the data processing times of the FFT processes 405 to 407 of the first to third channels is one eighth of the data processing time "t1" of the conventional FFT process.

The effect "y" to lessen the data-processing load in the FFT process of the embodiment of the acoustic feedback suppression apparatus according to the present invention from that of the conventional FFT process, both the above processes being performed with the data samples described in the above, can be given by the following formula, $$y=(1-(512(k-1)+4096)/4096k)\times 100(\%)$$

where "k" is the number of the channels.

As will be seen from the above formula, the FFT process of the acoustic feedback suppression apparatus 100 according to the present invention can attain an effect to lessen by about 65% the data-processing load where the number of channels "k" is 4, thereby making it possible for the acoustic feedback suppression apparatus 100 to remarkably reduce the data-processing load of the FFT process as well as the capacity to memorize the data samples. Furthermore, it is to be understood from the above formula that larger the number of the channels, enhanced the effect "y" to lessen the data-processing load. This results in the fact that the acoustic feedback suppression apparatus according to the present invention can certainly suppress acoustic feedback at a low cost even if the number of the channels is increased.

The number of channels having the acoustic feedback suppression performed thereon is not limited to four according to the present invention. The first number of data samples is not limited to 512, while the second number of data samples is not limited to 4096 according to the present invention. The second number of data samples should be larger than the first number of data samples to the degree to ensure acquiring the fp with the accuracy required by the acoustic feedback suppression according to the present invention.

As will be seen from the foregoing description, it is to be understood that the embodiment of the acoustic feedback suppression apparatus according to the present invention is constructed to have the number of the data samples in the fast Fourier transformation which is performed to specify the coefficients of the notch filter for suppressing the acoustic feedback larger than the number of the data samples in the fast Fourier transformation which is performed to identify the channel having the acoustic feedback caused thereon. The embodiment of the acoustic feedback suppression apparatus thus constructed can lessen the data processing load of the frequency analysis and decrease the capacity of the memory even if simultaneously suppressing the acoustic feedback of the sound signals respectively inputted to a plurality of channels.

INDUSTRIAL APPLICABILITY

An acoustic feedback suppression apparatus and an acoustic feedback suppression method according to the present invention have effects to lessen the data processing load of the frequency analysis, and are available to an acoustic feedback suppression apparatus for simultaneously suppressing acoustic feedback by judging whether or not the acoustic feedback components are caused in the sound signals respectively inputted to a plurality of channels.

What is claimed is:

1. An acoustic feedback suppression apparatus for suppressing acoustic feedback, comprising:

sound signal inputting means for inputting sound signals from a plurality of signal paths;

filtering means for filtering out acoustic feedback components from said sound signals;

signal path identifying means for identifying said signal paths having said acoustic feedback caused thereon after converting each of said sound signals into digital data with a first number of data samples; and filter coefficient specifying means for specifying filter coefficients of said filtering means after adding said sound signals respectively inputted from said signal paths and converting into digital data with a second number of data samples, wherein the second number of data samples is larger than the first number of data samples, and said filtering means is adapted to filter on the basis of said filter coefficients specified by said filter coefficient specifying means out said acoustic feedback components on said signal paths identified by said signal path identifying means.

2. An acoustic feedback suppression apparatus as set forth in claim 1, further comprising acoustic feedback characteristic comparing means for comparing characteristics of said acoustic feedback components converted into said digital data with said first number of data samples with characteristics of said acoustic feedback components converted into said digital data with said second number of data samples, said signal path identifying means being adapted to identify said signal paths having said acoustic feedback caused thereon based on the result of the comparison made by said acoustic feedback characteristic comparing means.

3. An acoustic feedback suppression apparatus as set forth in claim 2, in which said acoustic feedback characteristic comparing means is adapted to convert said digital data with said second number of data samples into digital data with said first number of data samples to compare said characteristics of said acoustic feedback components converted into said digital data with said first number of data samples with said characteristics of said acoustic feedback components converted into said digital data with said second number of data samples.

4. An acoustic feedback suppression apparatus as set forth in claim 1, in which the number of said signal path identifying means is smaller than the number of said signal paths.

5. An acoustic feedback suppression method, comprising the steps of:

filtering out, by a filter unit, acoustic feedback components from said sound signals inputted from a plurality of signal paths identifying said signal paths having said acoustic feedback caused thereon after converting each of said sound signals into digital data with a first number of data samples; and specifying filter coefficients of said filters after adding said sound signals respectively inputted from said signal paths and converting into digital data with a second number of data samples, wherein the second number of data samples is larger than the first number of data samples, and said filter unit is operated to filter on the basis of said specified filter coefficients out said acoustic feedback components on said identified signal paths.

6. An acoustic feedback suppression apparatus for suppressing acoustic feedback, comprising:

a sound signal input for inputting sound signals from a plurality of signal paths;

a filter for filtering out acoustic feedback components from said sound signals;

a signal path detector for identifying said signal paths having said acoustic feedback caused thereon after converting each of said sound signals into digital data with a first number of data samples; and a filter coefficient calculator for specifying filter coefficients of said filter after adding said sound signals respectively inputted from said signal paths and converting into digital data with a second number of data samples, wherein the second number of data samples is larger than the first number of data samples, and said filter is adapted to filter on the basis of said filter coefficients specified by said filter coefficient calculator out said acoustic feedback components on said signal paths identified by said signal path detector.

7. An acoustic feedback suppression apparatus as set forth in claim 6, further comprising acoustic feedback characteristic comparator for comparing characteristics of said acoustic feedback components converted into said digital data with said first number of data samples with characteristics of said acoustic feedback components converted into said digital data with said second number of data samples, said signal path detector being adapted to identify said signal paths having said acoustic feedback caused thereon based on the result of the comparison made by said acoustic feedback characteristic comparator.

8. An acoustic feedback suppression apparatus as set forth in claim 7, in which said acoustic feedback characteristic comparator is adapted to convert said digital data with said second number of data samples into digital data with said first number of data samples to compare said characteristics of said acoustic feedback components converted into said digital data with said first number of data samples with said characteristics of said acoustic feedback components converted into said digital data with said second number of data samples.

9. An acoustic feedback suppression apparatus as set forth in claim 6, in which the number of said signal path detectors is smaller than the number of said signal paths.

* * * * *